(12) United States Patent
Whitney et al.

(10) Patent No.: US 12,353,649 B2
(45) Date of Patent: Jul. 8, 2025

(54) INPUT DEVICE WITH OPTICAL SENSORS

(71) Applicant: Apple Inc., Cupertino, CA (US)

(72) Inventors: William Whitney, Capitola, CA (US); Yuhao Pan, Sunnyvale, CA (US); Ahmet Fatih Cihan, San Jose, CA (US); Tong Chen, Fremont, CA (US); Stephen E. Dey, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/809,848

(22) Filed: Jun. 29, 2022

(65) Prior Publication Data
US 2024/0004483 A1 Jan. 4, 2024

(51) Int. Cl.
G06F 3/0354 (2013.01)
G06F 3/03 (2006.01)
G06F 3/0346 (2013.01)
G06F 3/038 (2013.01)

(52) U.S. Cl.
CPC ........ *G06F 3/03542* (2013.01); *G06F 3/0304* (2013.01); *G06F 3/0346* (2013.01); *G06F 3/03546* (2013.01); *G06F 3/03549* (2013.01); *G06F 3/038* (2013.01); *G06F 2203/0384* (2013.01)

(58) Field of Classification Search
CPC .. G06F 3/03542; G06F 3/0304; G06F 3/0346; G06F 3/03546; G06F 3/03549; G06F 3/038; G06F 2203/0384
See application file for complete search history.

(56) References Cited

U.S. PATENT DOCUMENTS

| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |

(Continued)

FOREIGN PATENT DOCUMENTS

| CN | 1531706 A | 9/2004 |
| CN | 1659505 A | 8/2005 |

(Continued)

OTHER PUBLICATIONS

Final Office Action received for U.S. Appl. No. 15/650,512, mailed on Feb. 26, 2019, 27 pages.

(Continued)

*Primary Examiner* — Ariel A Balaoing
(74) *Attorney, Agent, or Firm* — Kubota & Basol LLP

(57) ABSTRACT

Optical sensors can be used for content generation using an input device without a touch sensitive surface. In some examples, the optical sensors can be used to detect characteristics of the input device including position, orientation, and/or motion of the input device. In some examples, some or all of the characteristics of the input device can be used in processing to generate content, including textual character input and three-dimensional objects. In some examples, the generation of content can use information from one or more additional sensors of the input device and/or from additional devices in combination with the characteristics of the input device based on the optical sensors.

18 Claims, 8 Drawing Sheets

(56) References Cited

U.S. PATENT DOCUMENTS

| | | | |
|---|---|---|---|
| 6,188,391 B1 | 2/2001 | Seely et al. | |
| 6,212,296 B1 | 4/2001 | Stork et al. | |
| 6,310,610 B1 | 10/2001 | Beaton et al. | |
| 6,323,846 B1 | 11/2001 | Westerman et al. | |
| 6,348,914 B1 | 2/2002 | Tuli | |
| 6,437,314 B1 | 8/2002 | Usuda et al. | |
| 6,441,807 B1 | 8/2002 | Yamaguchi | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,268,774 B2 | 9/2007 | Pittel et al. | |
| 7,646,379 B1 | 1/2010 | Drennan et al. | |
| 7,663,607 B2 | 2/2010 | Hotelling et al. | |
| 7,835,013 B2 | 11/2010 | Jones et al. | |
| 7,852,318 B2 | 12/2010 | Altman | |
| 7,880,726 B2 | 2/2011 | Nakadaira et al. | |
| 8,456,419 B2 | 6/2013 | Wilson | |
| 8,479,122 B2 | 7/2013 | Hotelling et al. | |
| 8,624,859 B2 | 1/2014 | Aono | |
| 8,692,979 B2 | 4/2014 | Moench et al. | |
| 8,922,530 B2 | 12/2014 | Pance | |
| 9,262,033 B2 | 2/2016 | Idzik et al. | |
| 10,555,079 B2 | 2/2020 | Bakish | |
| 10,557,701 B2 | 2/2020 | Jiang et al. | |
| 10,592,010 B1* | 3/2020 | Wang | G06F 3/017 |
| 10,771,884 B2 | 9/2020 | Mutlu et al. | |
| 10,871,820 B2 | 12/2020 | Mutlu et al. | |
| 11,614,806 B1* | 3/2023 | Cihan | G06F 3/038 345/179 |
| 2002/0148655 A1* | 10/2002 | Cho | G06F 3/03542 178/18.09 |
| 2003/0016212 A1* | 1/2003 | Lynggaard | G06F 3/0321 345/179 |
| 2004/0041798 A1* | 3/2004 | Kim | G06F 1/169 345/179 |
| 2004/0101310 A1* | 5/2004 | Wang | G06F 3/0383 398/140 |
| 2004/0150631 A1 | 8/2004 | Fleck et al. | |
| 2004/0189620 A1 | 9/2004 | Roh et al. | |
| 2004/0239702 A1 | 12/2004 | Kang et al. | |
| 2005/0024624 A1* | 2/2005 | Gruhlke | G06F 3/0421 356/3.01 |
| 2005/0150697 A1 | 7/2005 | Altman et al. | |
| 2005/0190157 A1* | 9/2005 | Oliver | G06F 3/0304 345/166 |
| 2006/0028456 A1* | 2/2006 | Kang | G06F 3/0312 345/179 |
| 2006/0197753 A1 | 9/2006 | Hotelling | |
| 2007/0003168 A1 | 1/2007 | Oliver | |
| 2007/0107744 A1 | 5/2007 | Dilbeck et al. | |
| 2007/0279399 A1* | 12/2007 | Nishimura | G06F 3/03546 345/179 |
| 2008/0018591 A1 | 1/2008 | Pittel et al. | |
| 2008/0150915 A1* | 6/2008 | Shibue | G06F 3/0421 345/176 |
| 2008/0198133 A1* | 8/2008 | Chen | G06F 3/0312 345/166 |
| 2010/0206645 A1* | 8/2010 | Harel | G06F 3/03542 178/19.02 |
| 2011/0090178 A1* | 4/2011 | Lai | G06F 3/03545 345/179 |
| 2011/0164000 A1 | 7/2011 | Pance | |
| 2012/0280948 A1 | 11/2012 | Barrus et al. | |
| 2013/0004283 A1* | 1/2013 | Bai | H01J 37/20 414/749.3 |
| 2013/0021244 A1 | 1/2013 | Kuge | |
| 2014/0085635 A1 | 3/2014 | Van Der Lee et al. | |
| 2014/0192028 A1 | 7/2014 | Leydon | |
| 2014/0327658 A1 | 11/2014 | Vardi | |
| 2015/0160851 A1 | 6/2015 | Michihata et al. | |
| 2015/0286293 A1 | 10/2015 | Gruhlke et al. | |
| 2015/0293612 A1* | 10/2015 | Chang | G06F 3/0386 345/158 |
| 2016/0073886 A1 | 3/2016 | Connor | |
| 2016/0092728 A1 | 3/2016 | Tsutsui | |
| 2017/0309057 A1 | 10/2017 | Vaganov | |
| 2017/0358144 A1 | 12/2017 | Schwarz et al. | |
| 2018/0018057 A1 | 1/2018 | Bushnell et al. | |
| 2019/0155411 A1 | 5/2019 | Kinrot et al. | |
| 2019/0313178 A1 | 10/2019 | Mutlu et al. | |
| 2020/0200522 A1 | 6/2020 | Huang et al. | |
| 2020/0209993 A1* | 7/2020 | Wang | G06F 3/038 |
| 2020/0264710 A1* | 8/2020 | Thomas, III | G06F 3/0321 |
| 2020/0319082 A1* | 10/2020 | Mutlu | G01N 15/1434 |
| 2020/0333891 A1* | 10/2020 | Poore | G02B 27/0176 |
| 2021/0010797 A1 | 1/2021 | Cihan et al. | |
| 2021/0011559 A1 | 1/2021 | Mutlu et al. | |
| 2021/0026464 A1 | 1/2021 | Yamada et al. | |
| 2021/0072833 A1 | 3/2021 | Mutlu et al. | |

FOREIGN PATENT DOCUMENTS

| | | | |
|---|---|---|---|
| CN | 103353793 A | 10/2013 | |
| CN | 105378585 A | 3/2016 | |
| JP | 2000-163031 A | 6/2000 | |
| JP | 2002-342033 A | 11/2002 | |
| WO | 2002/039421 A1 | 5/2002 | |
| WO | 2002/097721 A2 | 12/2002 | |

OTHER PUBLICATIONS

First Action Interview received for U.S. Appl. No. 15/650,512, mailed on Dec. 3, 2018, 5 pages.
Non-Final Office Action received for U.S. Appl. No. 15/650,512, mailed on Aug. 29, 2019, 5 pages.
Notice of Allowance received for U.S. Appl. No. 15/650,512, mailed on Jan. 21, 2020, 9 pages.
Preinterview First Office Action received for U.S. Appl. No. 15/650,512, mailed on Sep. 17, 2018, 5 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Notice of Allowance received for U.S. Appl. No. 17/319,010, mailed on Nov. 18, 2022, 10 pages.
Applicant Initiated Interview Summary received for U.S. Appl. No. 17/319,010, mailed on Feb. 17, 2022, 3 pages.
Non-Final Office Action received for U.S. Appl. No. 17/319,010, mailed on Apr. 4, 2022, 15 pages.
Non-Final Office Action received for U.S. Appl. No. 17/319,010, mailed on Oct. 5, 2021, 14 pages.

* cited by examiner

INPUT DEVICE WITH OPTICAL SENSORS

FIELD OF THE DISCLOSURE

This relates generally to input devices, and more particularly to input devices including optical sensors.

BACKGROUND OF THE DISCLOSURE

Many types of input devices are presently available for performing operations in a computing system, such as buttons or keys, mice, trackballs, joysticks, touch panels, touch screens and the like. Touch-sensitive devices, and touch screens in particular, are quite popular because of their ease and versatility of operation as well as their affordable prices. A touch-sensitive device can include a touch panel, which can be a clear panel with a touch-sensitive surface, and a display device such as a liquid crystal display (LCD) that can be positioned partially or fully behind the panel so that the touch-sensitive surface can cover at least a portion of the viewable area of the display device. The touch-sensitive device can allow a user to perform various functions by touching or hovering over the touch panel using a finger, stylus or other object at a location often dictated by a user interface (UI) being displayed by the display device. In general, the touch-sensitive device can recognize a touch or hover event and the position of the event on the touch panel, and the computing system can then interpret the event in accordance with the display appearing at the time of the event, and thereafter can perform one or more actions based on the event.

Styli have become popular input devices for touch-sensitive devices. In particular, use of an active stylus capable of generating stylus stimulation signals that can be sensed by the touch-sensitive device can improve the precision of stylus input. However, such styli require a touch-sensitive surface in order to generate content.

SUMMARY OF THE DISCLOSURE

This relates to an input device including optical sensors that can be used for content generation without a touch-sensitive surface. In some examples, optical sensors can include optical flow sensors and/or laser speckle flow sensors. As described herein, optical flow sensors can detect spatial-temporal image brightness variation (e.g., frame-to-frame brightness variation) to estimate motion of the input device. In some examples, an optical flow sensor can include an emitter (e.g., a light-emitting diode (LED)) to emit light to a target (e.g., surface), a detector (e.g., an image sensor) that captures an image of an environment to detect light reflected from or incident on the target (e.g., surface) in response to light emitted from the input device, and a lens or lens array configured to collimate or condition emitted light beams. It should be appreciated that the optical flow sensors can detect spatial-temporal image brightness variation in an imaging configuration with incoherent and/or ambient illumination.

As described herein, laser speckle flow sensors can detect speckle patterns resulting from coherent illumination of an imaging configuration to estimate motion of the input device. In some examples, a laser speckle flow sensor can include an emitter (e.g., vertical-cavity surface-emitting laser (VCSEL)) to emit light to a surface and a detector (e.g., an image sensor) that captures an image of an environment to detect light reflected from or incident on the surface in response to light emitted from the input device. In some examples, in addition to emitter and detector, the laser speckle flow sensor includes a lens or a lens array configured to collimate or condition emitted light beams. In some examples, the laser speckle flow sensor does not include a lens or a lens array. It should be appreciated that the laser speckle flow sensors can detect a speckle pattern (e.g., interference pattern) in an imaging configuration to estimate motion of the input device without a lens or lens array.

In some examples, the optical sensors can be used to detect characteristics of the input device including position, orientation, and/or motion of the input device. In some examples, some or all of the characteristics of the input device can be used in processing to generate content, including textual character input and three-dimensional objects. In some examples, the generation of content can use information from one or more additional sensors of the input device and/or from additional devices in combination with the characteristics of the input device based on the optical sensors. In some examples, the information acquired from the one or more additional sensors can include force applied by the input device, force applied by a stylus tip, inertial measurements, magnetic measurement, and/or computer vision measurements.

DETAILED DESCRIPTION

In the following description of examples, reference is made to the accompanying drawings which form a part hereof, and in which it is shown by way of illustration specific examples that can be practiced. It is to be understood that other examples can be used, and structural changes can be made without departing from the scope of the disclosed examples.

This relates to an input device including optical sensors that can be used for content generation without a touch-sensitive surface. In some examples, the optical sensors can be used to detect characteristics of the input device including position, orientation, and/or motion of the input device. In some examples, some or all of the characteristics of the input device can be used in processing to generate content, including textual character input and three-dimensional objects. In some examples, the process to generate content can include information from one or more additional sensors (e.g., a magnetic sensor, a force sensor, an inertial measurement unit (IMU) sensor) of the input device and/or from additional devices in combination with the characteristics of the input device based on the optical sensors.

Figure 1A:
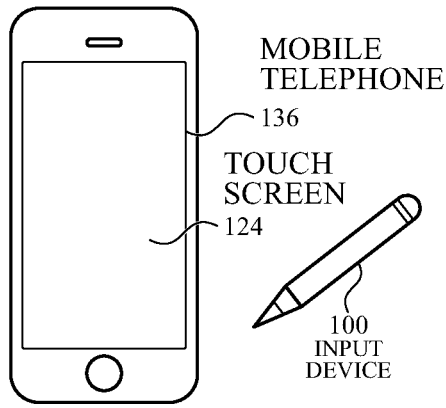
FIGS. 1A-1E illustrate example systems that can include a touch screen according to examples of the disclosure.
Figure 1B:
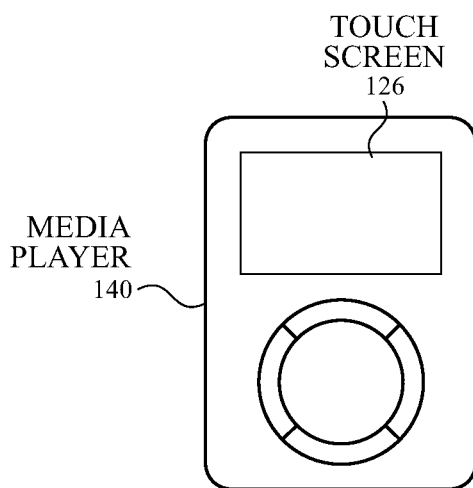
Figure 1C:
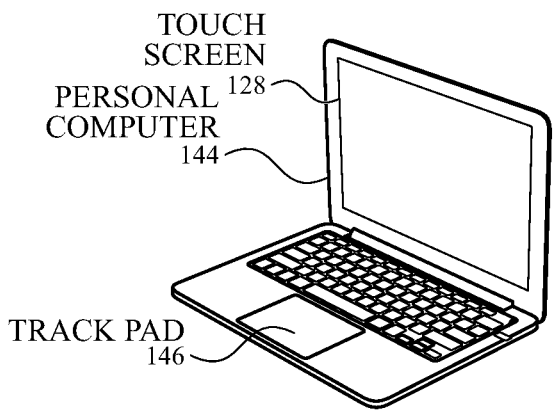
Figure 1D:
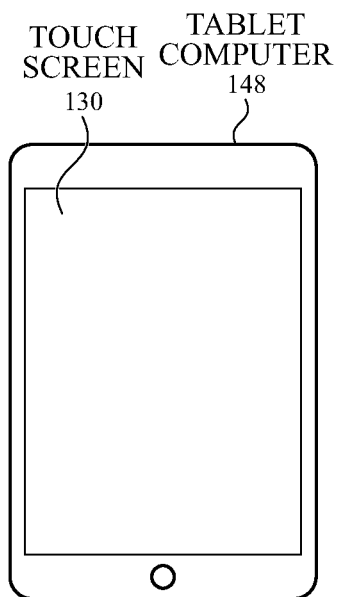
Figure 1E:
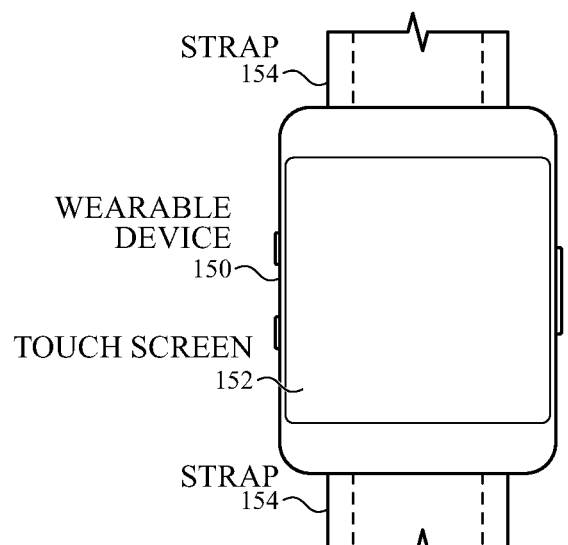

FIGS. 1A-1E illustrate examples of systems with touch screens that can accept input from an input device 100, such as an active stylus, via a touch-sensitive surface and/or via a non-touch-sensitive surface according to examples of the disclosure. FIG. 1A illustrates an exemplary mobile telephone 136 that includes a touch screen 124 that can accept input from an input device, such as an active stylus, via a touch-sensitive surface (e.g., touch screen 124) and/or via a non-touch-sensitive surface according to examples of the disclosure. FIG. 1B illustrates an example digital media player 140 that includes a touch screen 126 that can accept input from an input device, such as an active stylus, via a touch-sensitive surface (e.g., touch screen 126) and/or via a non-touch-sensitive surface according to examples of the disclosure. FIG. 1C illustrates an example personal computer 144 that includes a touch screen 128 that can accept input from an input device, such as an active stylus, via a touch-sensitive surface (e.g., touch screen 128) and/or via a non-touch-sensitive surface according to examples of the disclosure. FIG. 1D illustrates an example tablet computing device 148 that includes a touch screen 130 that can accept input from an input device, such as an active stylus, via a touch-sensitive surface (e.g., touch screen 130) and/or via a non-touch-sensitive surface according to examples of the disclosure. FIG. 1E illustrates an example wearable device 150 (e.g., a watch) that includes a touch screen 152 that can accept input from an input device, such as an active stylus, via a touch-sensitive surface (e.g., touch screen 152) and/or via a non-touch-sensitive surface according to examples of the disclosure. Wearable device 150 can be coupled to a user via strap 154 or any other suitable fastener. It should be understood that the example devices illustrated in FIGS. 1A-1E are provided by way of example, and other devices can accept input from an input device, such as an active stylus, via a touch-sensitive surface and/or via a non-touch-sensitive surface according to examples of the disclosure. Additionally, although the devices illustrated in FIGS. 1A-1E include touch screens, in some examples, the devices may have a non-touch sensitive display. As described in more detail below, the input device and computing device can include additional input/output (IO) capabilities to enable input from the input device via a non-touch-sensitive surface.

In some examples, touch screens 124, 126, 128, 130 and 152 can be based on self-capacitance. A self-capacitance based touch system can include a matrix of small, individual plates of conductive material or groups of individual plates of conductive material forming larger conductive regions that can be referred to as touch electrodes or as touch node electrodes. For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 152 can be based on mutual capacitance. A mutual capacitance based touch system can include electrodes arranged as drive and sense lines that may cross over each other on different layers (in a double-sided configuration) or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 152 can be based on mutual capacitance and/or self-capacitance. The electrodes can be arranged as a matrix of small, individual plates of conductive material or as drive lines and sense lines, or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
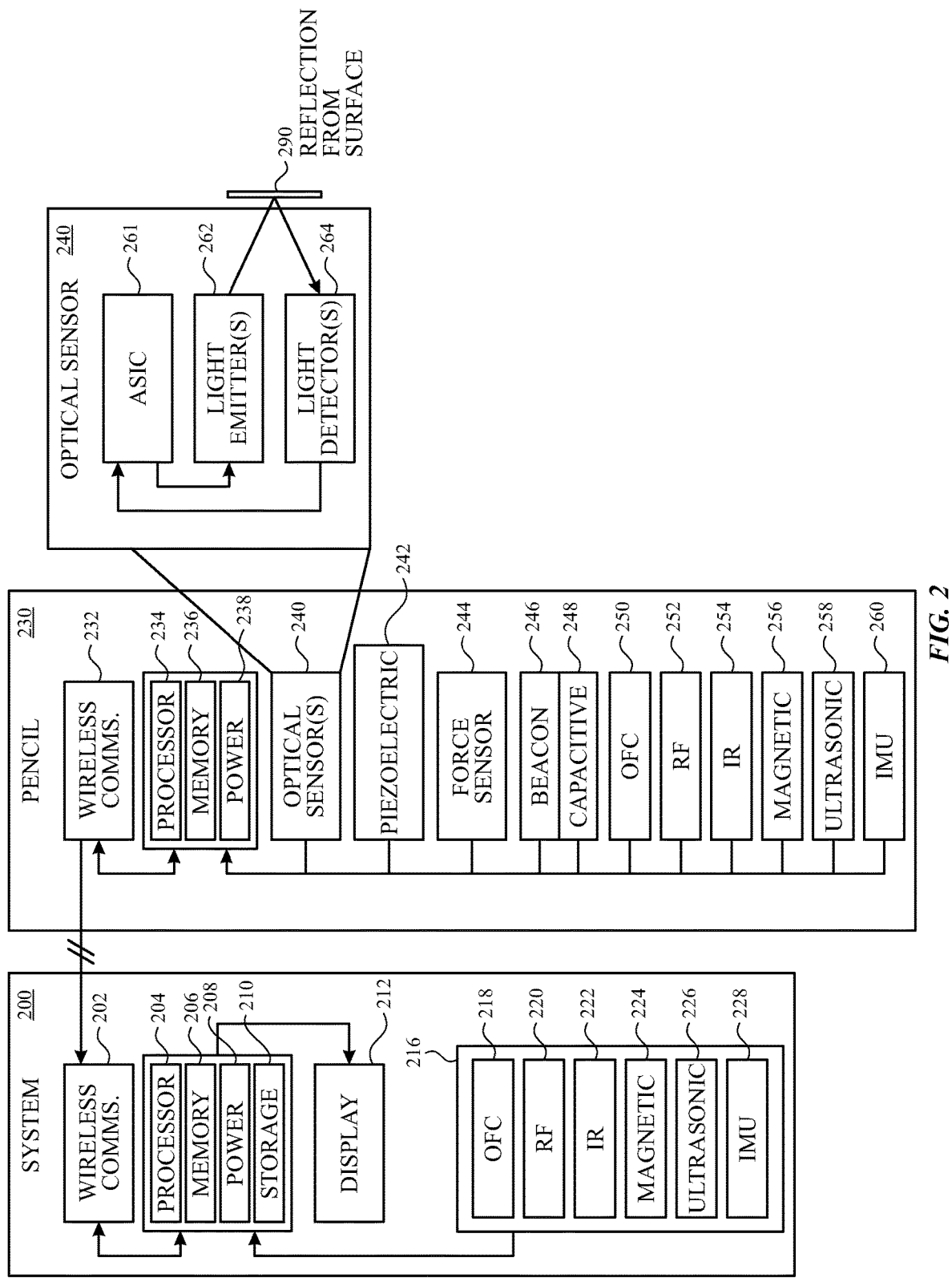
FIG. 2 illustrates a block diagram of an example system including an example computing system and an example input device according to examples of the disclosure.

FIG. 2 illustrates a block diagram of an example system including an example computing system 200 and an example input device 230, where the example input device 230 includes an example optical sensor 240, according to examples of the disclosure. Computing system 200 can receive input from input device 230, such as an active stylus, and render content for display generated using the input device 230, such as writing or drawing by a stylus. Computing system 200 can be included in, for example, mobile telephone 136, digital media player 140, personal computer 144, tablet computing device 148, wearable device 150, or any mobile or non-mobile computing device that includes a display. In some examples, wearable device 150 can be an AR/VR system with head-mounted display.

In some examples, computing system 200 can include an integrated display (e.g., touch screen) 212 to display images and to detect touch and/or proximity (e.g., hover) events from an object (e.g., active or passive stylus or finger) at or proximate to the surface of the display 212. In some examples, the display 212 can be configured to display content generated using input device 230 (e.g., writing or drawings on a non-touch sensitive surface, or on the touch sensitive surface of the display 212). In some examples, the computing system 200 can include a non-touch sensitive display configured to display content generated using the input device (e.g., writing or drawings on a non-touch sensitive surface).

In some examples, the computer system 200 can include a power source 208 (e.g., energy storage device such as a battery), host processor 204, program storage device 210 and/or memory 206, wireless communication circuitry 202, a camera 214, and sensor device(s) 216. The host processor 204 can control some or all of the operations of the computer system 200. The host processor 204 can communicate, either directly or indirectly, with some or all of the other components of the computer system 200. For example, a system bus or other communication mechanism can provide communication between the power source 208, the host processor 204, the display 212, the program storage device 210, the memory 206, the wireless communication circuitry 202, the camera 214, and the sensor device(s) 216.

The host processor 204 can be implemented as any electronic device capable of processing, receiving, or transmitting data or instructions, whether such data or instructions is in the form of software or firmware or otherwise encoded. For example, the host processor 204 can include a microprocessor, a central processing unit (CPU), an application-specific integrated circuit (ASIC), a digital signal processor (DSP), a controller, or a combination of such devices. As described herein, the term "processor" or "processing circuitry" is meant to encompass a single processor or processing unit, multiple processors, multiple processing units, or other suitably configured computing element or elements. In some cases, host processor 204 can provide part or all of the processing systems or processors described with reference to any of FIGS. 3-11.

The host processor 204 can receive touch input to the display 212 or other input devices and perform actions based on the outputs. For example, the host processor 204 can be connected to the program storage 210 (and/or memory 206) and a display controller/driver to generate images on the display screen. The display screen includes, but is not limited to, Liquid Crystal Display (LCD) displays, Light-Emitting Diode (LED) displays, including Organic LED (OLED), Active-Matrix Organic LED (AMOLED), Passive-Matrix Organic LED (PMOLED) displays, a projector, a holographic projector, a retinal projector, or other suitable display. In some examples, the display driver can provide voltages on select (e.g., gate) lines to each pixel transistor and can provide data signals along data lines to these same transistors to control the pixel display image for the display 212.

The host processor 204 can cause a display image on the display 212, such as a display image of a user interface (UI) or display image of content generated using the input device 230, and can use touch processor and/or touch controller to detect a touch on or near the display 212, such as a touch input to the displayed UI when the computing system 200 includes a touch screen. The touch input can be used by computer programs stored in program storage 210 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. The host processor 204 can also perform additional functions that may not be related to touch processing.

Note that one or more of the functions described in this disclosure can be performed by firmware stored in memory 206 and/or stored in program storage 210 and executed by the host processor 204 or other processing circuitry of the computing device 200. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, the program storage 210 and/or memory 206 can be a non-transitory computer readable storage medium. The non-transitory computer readable storage medium (or multiple thereof) can have stored therein instructions, which when executed by the host processor 204 or other processing circuitry, can cause the device including the computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

The power source 208 can be implemented with any device capable of providing energy to the computing system 200. For example, the power source 208 can include one or more batteries or rechargeable batteries. Additionally or alternatively, the power source 208 can include a power connector or power cord that connects the computing system 200 to another power source, such as a wall outlet.

The memory 206 can store electronic data that can be used by computing system 200. For example, memory 206 can store electrical data or content such as, for example, audio and video files, documents and applications, device settings and user preferences, timing signals, control signals, and data structures or databases. The memory 206 can include any type of memory. By way of example only, the memory 206 can include random access memory, read-only memory, Flash memory, removable memory, other types of storage elements, or combinations of such memory types.

Sensing device(s) 216 can include sensors circuitry configured to sense one or more types of parameters, such as but not limited to, vibration; light; touch; force; heat; movement; relative motion; biometric data (e.g., biological parameters) of a user; air quality; proximity; position; connectedness; and so on. In some examples, the sensing device(s) 216 can include an image sensor such as an outward facing camera 218, a radiofrequency sensor (and/or transmitter) 220, an infrared sensor (and/or transmitter) 222, a magnetic sensor (and/or generator) 224 (e.g., a magnetometer), an ultrasonic sensor (and/or transmitter) 226, and/or an inertial measurement unit 228. It should be understood the FIG. 2 illustrates some example sensors of sensing device(s) 216, but that the sensors are not so limited. In some examples, the sensing device(s) 216 can further include other sensor(s) including a force sensor, a heat sensor, a position sensor, a light or optical sensor, an accelerometer, a pressure transducer, a gyroscope, an acoustic sensor, a health monitoring sensor, and/or an air quality sensor, among other possibilities. Additionally, the one or more sensors of the sensing device(s) 216 can utilize any suitable sensing technology, including, but not limited to, interferometric, magnetic, capacitive, ultrasonic, resistive, optical, acoustic, piezoelectric, or thermal technologies.

Wireless communication circuitry 202 can transmit or receive data from another electronic device, such as from the input device 230. Although wireless communication circuitry 202 is illustrated and described, it is understood that other wired communication interfaces may be used. In some examples, the wireless and/or wired communications interfaces can include, but are not limited to, cellular, Bluetooth, and/or Wi-Fi communications interfaces. Although not shown, the computing system 200 can also include other input/output mechanisms including one or more touch sensing input surfaces, a crown, one or more physical buttons, one or more microphones or speakers, one or more ports such as a microphone port, and/or a keyboard.

The input device 230 can including a housing. In some examples, the housing of a stylus input device can include a cylindrical body (referred to herein as a stylus body) with a tip portion (referred to herein a stylus tip or tip portion) at the distal end. In some examples, the tip portion can be part of a unibody housing and in some examples, the tip portion can be removable from the cylindrical body. The housing can include an ergonomic depression (or multiple ergonomic depressions) as a guide for placement of one of a user's fingers (e.g., thumb or index finger). The ergonomic depression can result in the orientation of the input device in a range of positions with respect to a user's hand and finger gestures. The circuitry of the input device 230 can be disposed in the housing. For example, the circuitry can include a power source 238 (e.g., battery), processing circuitry (e.g., processor 234), memory 236, wireless communication circuitry 232, and various sensors. Note that one or more of the functions described in this disclosure can be performed by firmware stored in the memory 236 and executed by the processor 234 or other processing circuitry of the input device 230. The sensors can include optical sensors 240 among other possible sensors. In some examples, input device 230 can include an outward facing camera 250, a beacon transmitter 246 (e.g., using any electromagnetic signals), an ultrasonic sensor (and/or transmitter) 258, a force sensor 244 (e.g., such as a strain gauge, capacitive gap force sensor, a piezoelectric sensor 242), an IMU 260 (and/or other motion or orientation device such as an accelerometer or gyroscope), a capacitive electrode or other capacitive sensor 248, a radiofrequency sensor (and/or transmitter) 252, infrared sensor (and/or transmitter) 254, a magnetic sensor (and/or generator) 256, among other suitable sensors. Processor 234 can communicate, either directly or indirectly, with some or all of the other components of the input device 230. For example, a system bus or other communication mechanism can provide communication between the various components of the input device 230.

As described herein, in some examples, motion and/or position of the input device 230 can be tracked to generate input for the computing system 200. In some examples, position and/or motion of the input device 230 can be tracked using optical sensors 240. For example, the input device 230 can include a single optical sensor 240 or a plurality of optical sensors 240. In some examples, the input device 230 can be a stylus, and the optical sensor(s) 240 can be disposed in the distal end of the stylus, such as in proximity the stylus tip. The optical sensor(s) 240 can be configured to both transmit and receive light (e.g., emitting and receiving a laser beam), which can provide data about the position and movement of the stylus tip relative to a non-touch-sensitive surface.

In some examples, tracking the position and/or motion of the input device 230 using the optical sensor(s) 240 can be augmented with additional sensors. For example, the sensor device(s) 216 and or the various sensors of the input device 230 can track information about the input device 230 (e.g., position, motion, orientation, force, etc. of the input device) and the information can be transferred from the one or more sensor device(s) 216 to the host processor 204. The information from the input device 230 (e.g., received via wireless communication circuitry 202, 232) and the one or more sensor device(s) 216 can be stored in memory 206, in some examples. The information can be processed by host processor 204 to render and/or display content on the display 212 from the input device 230 (e.g., rendering writing or drawing by a stylus input device on non-touch sensitive surfaces on the display). In some examples, the information about the input device 230 can be gathered by, transferred to, processed by and/or stored on the stylus. For example, one or more sensing modalities within the input device 230 can provide additional information about input device force, orientation, motion, and/or position. The combined information from the optical sensors 240 and the one or more sensing modalities can then be transferred to, processed by, and/or stored on a computing device to render and/or display content on the display 212 according to examples of the disclosure. In some examples, a computing device can render content in three-dimensional environment based on position and/or motion of an input device. For example, system 200 can be a head-mounted augmented and/or virtual reality headset that can render and overlay content over a real-world environment or a representation of a real-world environment captured by outward facing cameras 218.

Each optical sensor 240 can include an application-specific integrated circuit (ASIC) 261, light emitter(s) 262, and/or one or more light detector(s) 264. As mentioned, the light emitter(s) 262 can emit light onto a surface 290, and the light detector(s) can capture an image of an environment to detect light reflected from the surface 290 in response to light emitted from the input device 230. In some examples, the light emitter(s) 262 can include a light-emitting diode (LED) or a vertical-cavity surface-emitting laser (VCSEL). In some examples, the light detector(s) 264 can include an image sensor. Further, the optical sensor 240 optionally includes a lens or a lens array.

It should be apparent that the architecture shown in FIG. 2 is only one example architecture of the computing system 200, the input device 230, and the optical sensor 240 and that the system could have more or fewer components than shown, or a different configuration of components. The various components shown in FIG. 2 can be implemented in hardware, software, firmware, or any combination thereof, including one or more signal processing and/or application specific integrated circuits.

Figure 3A:
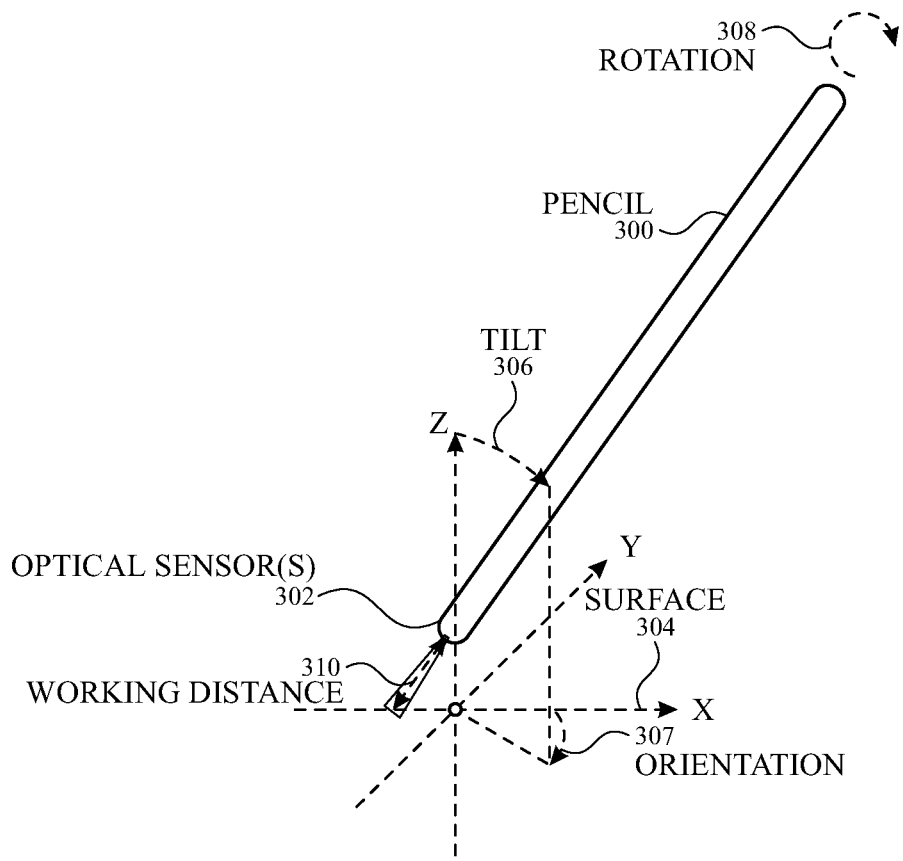
FIG. 3A illustrates an example input device according to examples of the disclosure.

FIG. 3A illustrates an input device according to examples of the disclosure. The input device can be a stylus (e.g., digital pencil) 300 including optical sensor(s) 302 and a tip formed at least partially from a partially or completely optically transparent material (e.g., cover glass). The optical sensor(s) 302 can measure motion (e.g., displacement in position (x-y-z plane) and/or displacement in angle such as tilt 306, orientation 307, and/or rotation 308) of the stylus 300 relative to a surface 304 based on detecting light reflected from the surface 304 in response to light emitted from the stylus 300. The surface 304 optionally includes a non-touch sensitive surface (e.g., a tabletop, wall). In some examples, the optical sensor(s) 302 can measure motion of the stylus 300 when the stylus 300 is within a threshold working distance 310 from the surface 304. For example, the optical sensor(s) 302 can measure motion of the stylus 300 when the stylus 300 is hovering 0 to 2, 3, 4, 5, 6, 7, 8, 9, 10, 15, 30, or 100 millimeters from the surface 304.

In some examples, the optical sensor(s) 302 can measure a displacement along a first axis (e.g., displacement along x-axis), a displacement along a second axis orthogonal to the first axis (e.g., displacement along y-axis), a displacement along a third axis orthogonal to the first axis and the second axis (e.g., displacement along z-axis), a tilt angle 306, an orientation angle 307, and/or an axial angle (e.g., rotation angle) 308 of the stylus 300. Accordingly, processing circuitry of the stylus 300 can compute displacement in position and/or displacement in angle of the stylus 300 via the optical sensor(s) and/or additional sensors, as described in detail below. As described herein, displacement in position refers to displacement of the stylus with respect to three axes, such as x-axis, y-axis, and/or z-axis. As described herein, displacement in angle refers to tilt 306, orientation 307, or rotation 308

Figure 3B:
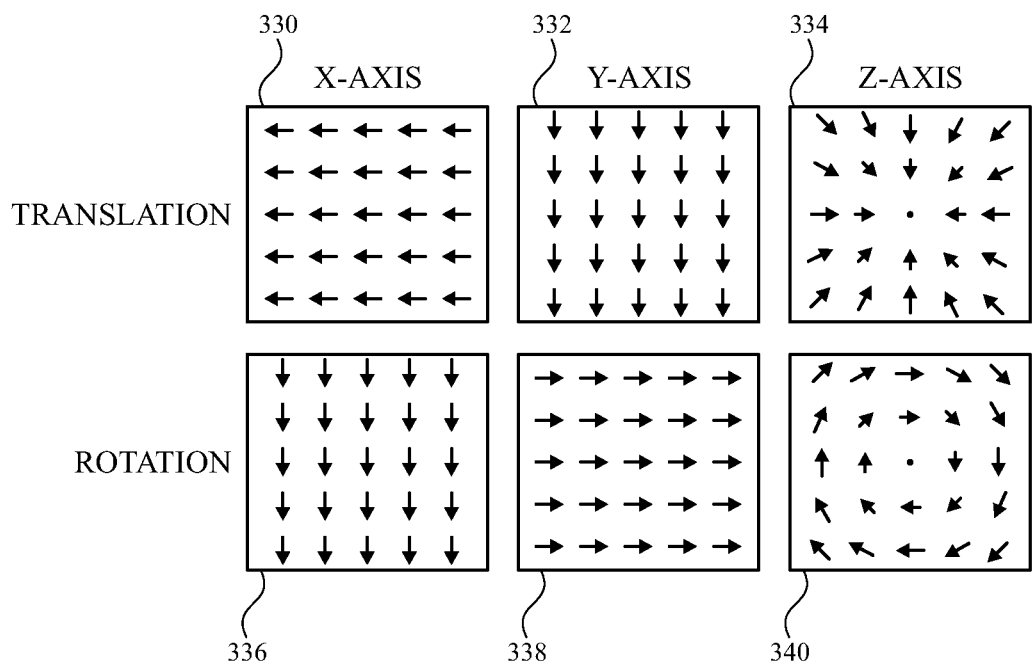
FIG. 3B illustrates graphs corresponding to various motions of an example input device according to examples of the disclosure.

In some examples, the optical sensor(s) can measure motion of the stylus in up to six degrees of freedom (e.g., three translation degrees of freedom and three rotation degrees of freedom). As described herein, the three translation degrees of freedom include x, y, and z displacement (e.g., displacement in position). As described herein, the three rotation degrees of freedom include tilt, orientation, and axial rotation (e.g., displacement in angle). As such, FIG. 3B illustrates graphs describing example transformations of an optical flow image recorded by optical sensor(s) corresponding to various motions of an input device according to examples of the disclosure, assuming the input device is initially co-axial with the z-axis. For example, the input device includes optical sensor(s) that can measure translation of the stylus with respect to the x-axis (e.g., stylus moving leftward relative to the surface, generating the transformation shown by graph 330, or rightward relative to the surface), translation of the stylus with respect to the y-axis (e.g., stylus moving downward relative to the surface, generating the transformation shown by graph 332, or upward relative to the surface), translation of the stylus with respect to the z-axis (e.g., stylus moving closer to the surface, generating the transformation shown by graph 334, or stylus moving away from the surface), rotation of the stylus with respect to the x-axis (e.g., orientation of the stylus around the x-axis, generating the transformation shown by graph 336), rotation of the stylus with respect to the y-axis (e.g., orientation of the stylus around the y-axis, generating the transformation shown by graph 338), and/or rotation of the stylus with respect to the z-axis (e.g., self-rotation of the stylus about the z-axis, generating the transformation shown by graph 340). As illustrated, graphs 332 and 336 appear to be similar because the rotational movement of the stylus relative to the x-axis may generate a similar transformation of the recorded image as translational movement relative to the y-axis. To break this ambiguity, data from a single optical flow sensor may be fused with data from additional optical flow sensor(s) and/or other types of sensors. In some examples, because a single optical sensor is configured to track displacement in only two dimensions (e.g., in an x-y plane), the stylus can include two or more optical sensors to measure displacement in position and/or displacement in angle of the stylus. As discussed above, displacement in position includes displacement of the stylus with respect to the three axes, such as x-axis, y-axis, and/or z-axis. Displacement in angle includes tilt, orientation, and/or rotation of the stylus. In some examples, as described below, the stylus includes an additional sensor, such as a magnetic sensor, a force sensor, or an inertial measurement unit (IMU) sensor, to measure displacement (e.g., translation) along z-axis, tilt, orientation, and/or axial rotation of the stylus.

Figure 4:
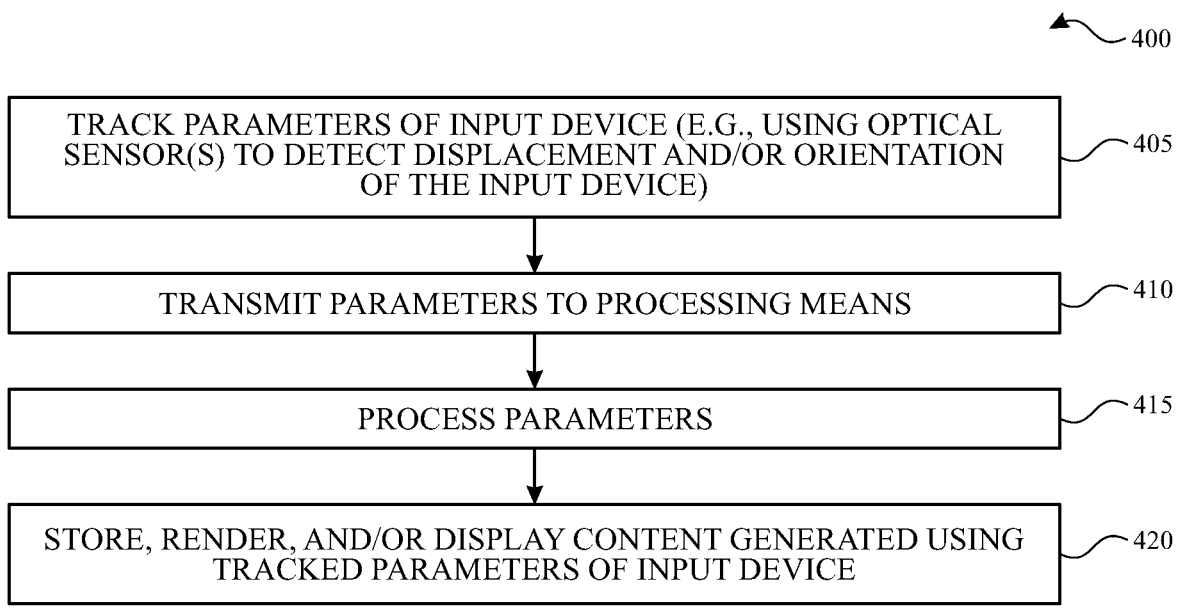
FIG. 4 illustrates an example process for generating content with an input device on a non-touch sensitive surface according to examples of the disclosure.

As described herein, in some examples, an input device including optical sensors can be used for input on a non-touch sensitive surface. FIG. 4 illustrates an example process 400 for generating content with an input device on a non-touch sensitive surface according to examples of the disclosure. At 405, one or more parameters associated with the input device can be detected and/or tracked. In some examples, the parameters associated with the input device can be detected and/or tracked at least partially using optical sensors. In some examples, the one or more parameters can include a position of the input device, motion of the input device, orientation of the input device, and force information, among other parameters. In some examples, the optical sensors can be used to track motion of a stylus tip relative to a non-touch sensitive surface to determine displacement in up to six degrees of freedom (e.g., displacement in position and/or displacement in angle) and distance of the stylus tip relative to the non-touch sensitive surface. In some examples, force information can represent contact between the input device (e.g., stylus tip), measured using a force sensor. In some examples, the force data can be represented as variable force measurements, such as raw data representative of the force applied to the stylus tip. In some examples, the force data can be represented as a binary measurement, in which a force measurement above a first threshold can result in a report of a contact and a force measurement below a second threshold can result in a break of contact with the surface. In some examples, the first and second thresholds can be the same. In some examples, the first and second thresholds can be different to provide a level of hysteresis and avoid high frequency transitions between detecting an initiation or break in contact.

At 410, the parameters associated with the input device—optionally including position, motion, and/or orientation of the input device—can be transmitted to processing means. At 415, the parameters associated with the input device can be processed by the processing means. In some examples, the processing means can include the processor 234 which can be configured to process the parameters from the optical sensors into processed parameters. For example, the parameters associated with the input device that are detected and/or tracked by the optical sensors and/or received by the processor 234 from the optical sensors include two-dimensional, three-dimensional, four-dimensional, five-dimensional, or six-dimensional displacement parameters (e.g., x, y, and z relative displacement, tilt, orientation, and/or axial rotation). In some examples, the processor 234 can be configured to process and/or compute the two-dimensional, three-dimensional, four-dimensional, five-dimensional, or six-dimensional displacement parameters based on receiving data from the optical processors. In some examples, the parameters tracked by the optical sensors can be processed along with other parameters associated with the input device that are detected and/or tracked by other sensors of the input device to generate processed parameters. In some examples, the processing means can include processor 234 and/or host processor 204, which can be configured to process the parameters from the optical sensors into processed parameters. For example, the parameters associated with the input device that are detected and/or tracked by the optical sensors of the input device (optionally processed in part by processor 234) can be transmitted to host processor 204 for processing by a different computing device (e.g., computing system 200) to generate processed parameters. In some examples, the processing circuitry of the different computing device (e.g., host processor 204) can be configured to process the parameters associated with the input device that are received from the input device and the parameters detected and/or tracked by sensor device(s) of the computing device.

At 420, processed parameters associated with the input device can be stored in memory in one or both of the input device and a different computing device (e.g., in memory 206 or 236). For example, the results of processing by processor 204 can be stored in memory 236 and/or transmitted to computing system 200 for storage, rendering and/or display of input device content (e.g., writing or drawing) based on the tracked and processed parameters of the input device. Additionally or alternatively, in some examples, the parameters can be transferred between the input device and the computing device (e.g., using wired or wireless communication circuitry). The tracked input device parameters can be stored and/or processed to generate content at the computing device that can be rendered on the display.

In some examples, the detection and/or tracking of one or more parameters can be performed when the input device is not touching or proximate to a touch-sensitive surface of a computing device (e.g., disabled when over or touching a display 212). In some examples, the detection and/or tracking of one or more parameters can be performed when the different computing device detects the input device in proximity (e.g., within a threshold distance such as 0, 1, 2, 3, 4, 5, 10, 50, 100 millimeters) with a non-touch sensitive surface and/or when the different computing device detects a hand holding the input device in a pose and/or with an orientation indicative of intended input by the user of the input device.

Figure 5:
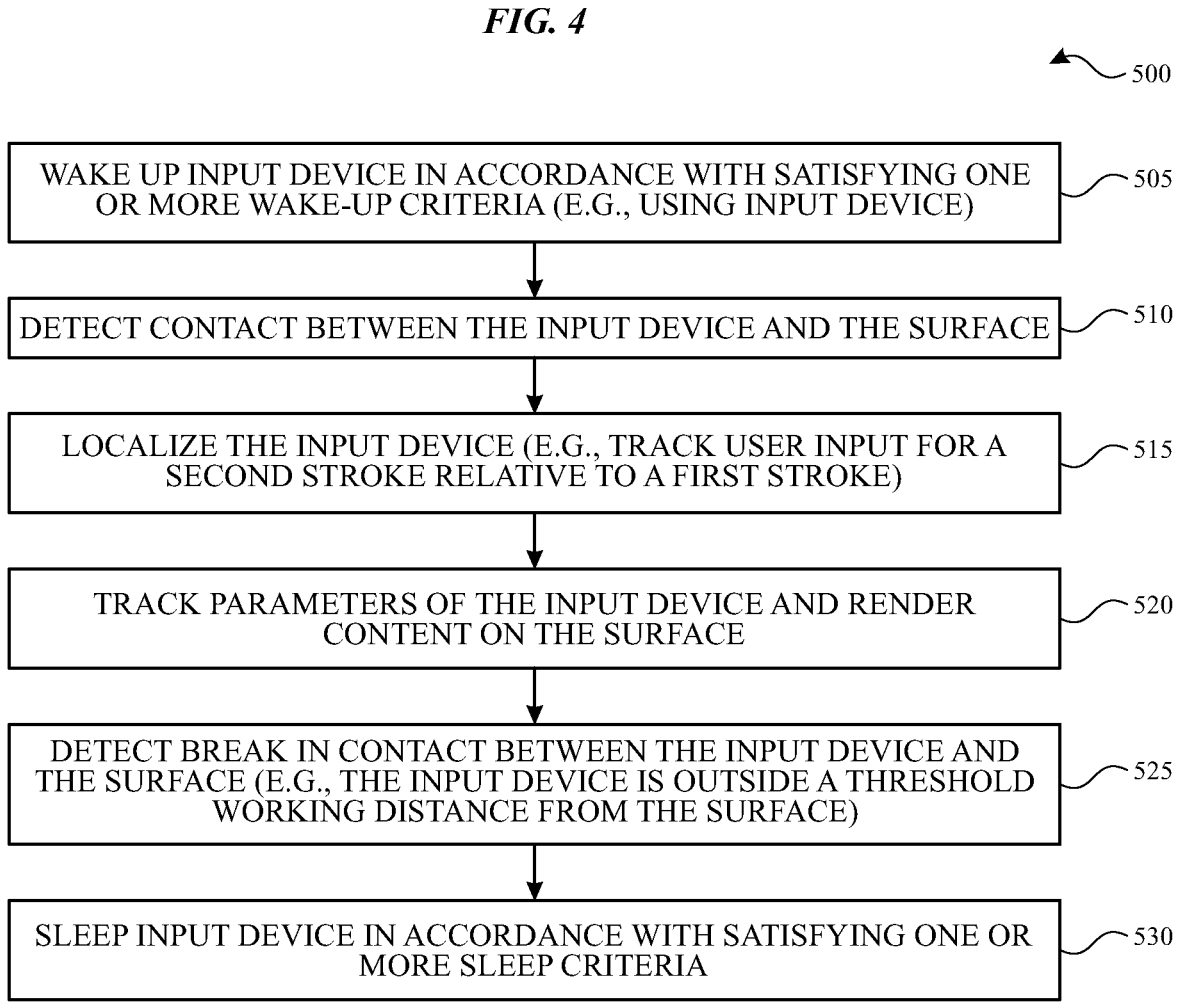
FIG. 5 illustrates an example process for generating content with more one or more input devices on a non-touch sensitive surface according to some examples of the disclosure.

As described herein, in some examples, a system including an input device with optical sensors and a computing device including a display (e.g., a head-mounted display device) can be used for rendering content on the display based on input from the input device on a non-touch sensitive surface. FIG. 5 illustrates an example process 500 for generating content with more one or more input devices on a non-touch sensitive surface according to some examples of the disclosure. At 505, the input device can be activated (woken up) in accordance with satisfying one or more activation criteria. In some examples, activating or waking-up the input device can cause the optical sensors to be powered on to measure parameters of the input device, can cause an input device processor to be powered on to process the data from the optical sensors and/or power on the communication circuitry to transmit data from the input device to a different computing device. In some examples, activating or waking-up the input device can refer to configuring the optical sensor scans to run at a different scan rate (e.g., more frequently) or at a different (e.g., higher) resolution of optical sensor scan, configuring the wireless communication circuitry to operate at a different power level or rate (e.g., increasing the power and/or rate of communication), and/or configuring the processing circuitry to operate at a different power level or rate (e.g., increasing the power and/or processing rate), among other possibilities.

In some examples, the one or more activation criteria can be based on detecting and/or tracking one or more parameters associated with the input device indicative of a change in an operating state of input device. In some examples, the activation criteria can be related to one or more sensors of the input device. For example, as discussed previously, the input device can include a force sensor (e.g., force sensor 244, piezoelectric sensor 242) configured to detect force above a threshold indicative of a user holding the input device (e.g., a force-based activation criterion that is satisfied when the amount of force is above a threshold, and not satisfied when the force threshold is below the threshold). In some examples, the force sensor can be a strain gauge or piezoelectric sensor (e.g., corresponding to piezoelectric sensor 242). In some examples, the force sensor can be disposed beneath an ergonomic depression in a body of the input device (e.g., stylus body). In some examples, the force sensor can be disposed in other regions around the stylus body. Additionally or alternatively, in some examples, one or more optical sensors can also be configured as a force sensor. As another example, the input device can include a motion sensor (e.g., IMU 260) configured to detect motion of the input device. In some examples, a specific orientation of the input device and/or a pattern of movement of the input device can be indicative of a user picking up the input device and/or holding the input device in a pose ready for user input. In such examples, the one or more activation criteria can include a motion and/or orientation based activation criterion that is satisfied when the motion and/or orientation indicate a user picking up the input device or holding the input device in a pose for input, and not satisfied when the motion and/or orientation indicate otherwise.

Additionally or alternatively, in some examples, the activation criteria can relate to one or more sensors of a computing device different from the input device. For example, an image sensor of a computing device (e.g., outward facing camera(s) 218) can be used. In some examples, the activation criteria can include a criterion that the input device is within the field of view of the outward facing camera(s) 218. In some examples, the activation criteria can include a criterion that the input device is within a threshold working distance of a writing surface (e.g., a wall, a table, a pad of paper, a floor). When the input device is within the threshold working distance of the writing surface, the optical sensors can activate surface tracking and/or measure parameters of the input device relative to the writing surface. For example, the threshold working includes the input device being within 0 to 2, 3, 4, 5, 6, 7, 8, 9, 10, 15, 30, or 100 millimeters of the writing surface. In some examples, the activation criteria can include a criterion that the input device is held within a hand based on detection of a pose of the hand holding the input device and/or based on a pattern of occlusion of the input device by a hand of the user.

At 510, input device can detect contact between the input device and a surface (e.g., a non-touch sensitive surface or a touch-sensitive surface). In some examples, contact between the input device and the surface can indicate an input from the input device (e.g., an initiation of writing or drawing input). In some examples, the contact can be based on one or more sensors of the input device. In some examples, the optical sensors (e.g., optionally activated when the activation criteria are satisfied) can be used to track distance between a tip of the input device (e.g., stylus tip) and the surface, and a contact can be detected when the distance to the surface is less than a threshold (e.g., zero or within a threshold of zero based on the distance between the optical sensor and the stylus tip point). Additionally or alternatively, the contact can be detected based on force applied to the stylus tip (e.g., using force sensor 244) or based on motion (e.g., using an accelerometer or IMU 260) that are indicative of contact between the input device and the surface.

At 515, the system can localize the input device to determine one or more spatial relationships between the input device and the computing device or between the input device and the surface within a three-dimensional space. As described herein, localizing the input device can enable the tracking and generation of content using relative movement detected by the optical sensors of the input device. In some examples, a spatial relationship between the input device (e.g., stylus tip) and a non-touch-sensitive surface can be determined. In some examples, a variety of sensors and/or wireless communication circuitry can be used to determine the stylus position and/or motion with respect to the surface. For example, optical sensors can be used to determine parameters including, but not limited to, angle (e.g., tilt, orientation, or rotation), movement, and position in relation to the surface. In some examples, the input device can be localized using the sensors of the system. For example, the computing device (e.g., a head mounted display) can use outward facing camera(s) 218 to detect the input device with respect to a three-dimensional surface. In some examples, the computing device can generate information including, but not limited to, the position and/or movement of the outward facing camera(s) 218 with respect to a non-touch sensitive surface. In some examples, a head mounted display comprising the outward facing camera(s) 218 can capture information about the position and/or movement of the outward facing camera(s) 218 with respect to the input device. In some examples, the system can additionally or alternatively use one or more infrared sensors (e.g., using infrared sensor (and/or transmitter) 222, 254), magnetic sensors (e.g., magnetic sensor (and/or generator) 224, 256), radiofrequency sensors (radiofrequency sensor (and/or transmitter) 220, 252), etc. to localize the input device relative to the surface. In some examples, the input device can comprise one or more infrared (IR) or near IR wavelength light-emitting diodes and the computing system can include one or more cameras configured to detect 2D/3D position of IR or near IR light (e.g., to detect a pattern of IR or near IR light and/or a sequence of positions or patterns of IR or near IR light). In some examples, the input device can comprise active or passive magnetic components and/or RF components configured to operate in an ultra-low power mode or without a power supply and the computing system can include a magnetometer or RF receivers to triangulate three-dimensional position of the input device.

In some examples, the localization can match and lock the input device self-orientation (e.g., tilt, orientation, or rotation) with the three-dimensional writing surface orientation, so that writing or drawing input from the input device can be displayed accurately along with the surface or a representation of the surface in a three-dimensional environment.

At 520, the parameters of the input device can be tracked and used to render content on the three-dimensional environment displayed by the display. For example, the head mounted display can be used in conjunction with the input device to display writing or drawings on a non-touch sensitive surface in the real-world environment. The rendering can be based on relative motion by the input device and based on the spatial relationships from the localization at 415. For example, as described above with respect to FIG. 4, one or more parameters associated with the input device can be detected and/or tracked. The one or more parameters can include position, orientation, and/or movement of the one or more input devices. In some examples, the one or more parameters can include a displacement of the stylus tip tracked using the optical sensors, including angle-corrected displacement. In some examples, the computing device of the system (e.g., a head mounted display) can present the three-dimensional environment or a representation of the three-dimensional environment and render writing or drawing by the input device using the one or more parameters tracked at least partially using the optically sensors in the three-dimensional environment. As described above with respect to FIG. 4, the tracking of the one or more parameters can include tracking additional complimentary, or redundant information from the optical sensors or additional sensors (e.g., IMU of the input device, force of the force sensors, distance from the surface, etc.) to augment the tracking of the input device motion, orientation and force to render the input device content.

At 525, the input device can detect a break in contact between the input device and the surface (e.g., a non-touch sensitive surface or a touch-sensitive surface). In some examples, the break in contact between the input device and the surface can indicate a temporary end of an input from the input device (e.g., an initiation of a break in writing or drawing input between strokes). These breaks can be used to avoid digital inking using the input device between strokes. In some examples, the break in contact can be based on one or more sensors of the input device. In some examples, the optical sensors can be used to track distance between the stylus tip and the surface, and a break in contact can be detected when the distance to the surface is greater than a threshold (e.g., zero or more than a threshold of zero based on the distance between the optical sensor and the stylus tip point). Additionally or alternatively, the break in contact can be detected based on force applied to the stylus tip (e.g., using force sensor 244) or based on motion (e.g., using an accelerometer or IMU 260) that are indicative of a break in contact between the input device and the surface.

At 530, the input device can be deactivated (sleep) in accordance with satisfying one or more deactivation criteria. In some examples, deactivating or sleeping the input device can cause the optical sensors to be powered down (put in a low-power mode), causing the input device processor to be powered down (put in a low-power mode) and/or power down (put in a low-power mode) the communication circuitry. In some examples, deactivating or sleeping the input device can refer to configuring the optical sensor scans to run at a different scan rate (e.g., less frequently) or at a different (e.g., lower) resolution of optical scan, configuring the wireless communication circuitry to operate at a different power level or rate (e.g., decreasing the power and/or rate of communication), and/or configuring the processing circuitry to operate at a different power level or rate (e.g., decreasing the power and/or processing rate), among other possibilities. The one or more sleep criteria can include one or more of detecting a user is no longer holding the input device or no longer using the input device for input (e.g., force threshold is below a threshold, motion indicative of a user putting down the input device and/or holding the input device outside a pose ready for user input, a writing surface is not detected in the field of view of the outward facing camera(s) 218, the input device is outside a threshold working distance of a writing surface, and/or a visual indication that the input device is not held within a hand).

Localization can be performed in a number of contexts, including, but not limited to, when the stylus enters a wake-up condition, when the stylus comes within a threshold working distance of a non-touch sensitive writing surface, when the stylus begins and/or stops writing as described by step 525, when the stylus is placed on a surface, when the stylus is moved across a surface, intermittently while the stylus is at rest 530, etc.

It is understood that process 500 illustrated in FIG. 5 is not limited to the operation as presented, but can include, fewer, additional, and/or simultaneous operations according to various examples. For example, the input device may remain in an activation state at all times or be manually activated rather than activating or deactivating the input device at 505 and 535. Additionally or alternatively, the system can localize and re-localize the input device relative to the computing device and/or real-world surface multiple times before, during, and after contact, tracking parameters of the input device, or break in contact. In some examples, writing or drawing input from the input device can be used without rendering the content on the display at the localized region within the three-dimensional environment. For example, the tracking of the input device position can be used to identify specific relative motions indicative of corresponding inputs. For example, input writing letters can be used to render text input to an active text input user interface on the display without the writing being rendered as handwriting at the location of the input device within the three-dimensional space. As another example, movement corresponding to a check mark can be detected as a selection or confirmation input rather than as writing or drawing input localized to the surface within the three-dimensional environment.

Figure 6A:
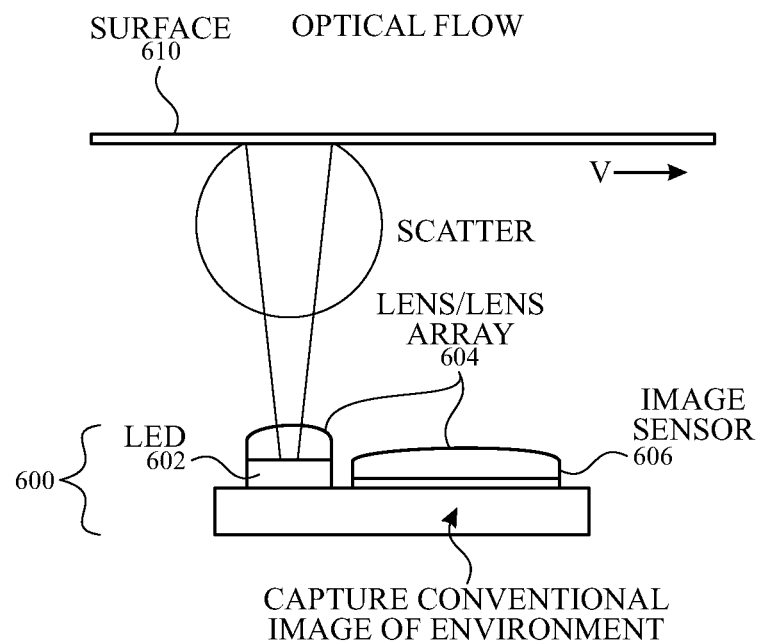
FIG. 6A illustrates an example optical flow sensor configuration of an input device according to examples of the disclosure.

As described herein, optical sensor(s) can be used to track distance to a surface and/or relative motion of the input device with respect to a surface. In some examples, the optical sensor(s) can be configured to emit two or more beams to the surface external to the input device as described with reference to FIG. 10. In some examples, optical sensor(s) can be configured to emit light toward a component at least partially internal to the input device as described with reference to FIG. 11. As described herein, optical sensor(s) can include optical flow sensor(s) and/or laser speckle flow sensor(s). FIG. 6A illustrates an optical flow sensor configuration of an input device according to examples of the disclosure. An optical flow sensor 600 includes a light emitter, such as a light-emitting diode (LED) 602, a lens or lens array 604, and a light detector, such as an image sensor 606. In some examples, the light detector can include a complementary metal-oxide semiconductor (CMOS) image sensor or a single photon avalanche detector (SPAD) array. The optical flow sensor 600 can be disposed within a stylus body, such as at a stylus tip. The LED 602 can emit light to a surface 610. The lens or lens array 604 can be disposed at the stylus tip along with the LED 602 and image sensor 606. In some examples, the lens or lens array 604 disposed between the LED 602 and an end point of the stylus tip can collimate or condition light emitted by the LED 602 or reflected from the surface 610. The images sensor 606 can capture an image of an environment to detect light reflected from or incident on the surface 610 in response to light emitted from the input device.

The optical flow sensor 600 can include any suitable number and arrangement of light emitters (e.g., LED 602), lens (e.g., lens or lens array 604), and light detectors (e.g., image sensor 606). In some examples, the optical flow sensor 600 can include a single light emitter or an array of light emitters adjacent to a single light detector or array of light detectors. In some examples, the optical flow sensor 600 can include a central light emitter surrounded by a ring of light detectors. In some examples, the optical flow sensor 600 can include a central light detector surrounded by a ring of light emitters.

In some examples, optical flow sensor(s) can be arranged and the materials of the stylus tip can be designed to provide an improved or optimal refraction angle for the beams of the optical sensors. In some examples, in an optical flow sensor 600, optical components can be coupled to or disposed above the LED 602 and/or image sensor 606 to properly orient beams of light emitted and/or received by the optical flow sensor 600. For example, the optical components can comprise a lens or lens array 604 and one or more translucent or transparent materials (e.g., a total internal reflection surface) configured to refract light in a desired (or optimal) refraction angle. Lens materials can comprise translucent or transparent material, including, but not limited to, a lens substrate, glass, optical polyester (e.g., OKP-1), organic materials, etc. The lens or lens array 604 can be shaped to refract and/or reflect light as required to achieve a desired signal-to-noise ratio (SNR), system speed, and/or accuracy. For example, the lens or lens array 604 can be shaped to focus and/or collimate the light. Although optical components are shown for one optical flow sensor in FIG. 6A, it is understood that similar components could be used for each optical flow sensor.

Figure 6B:
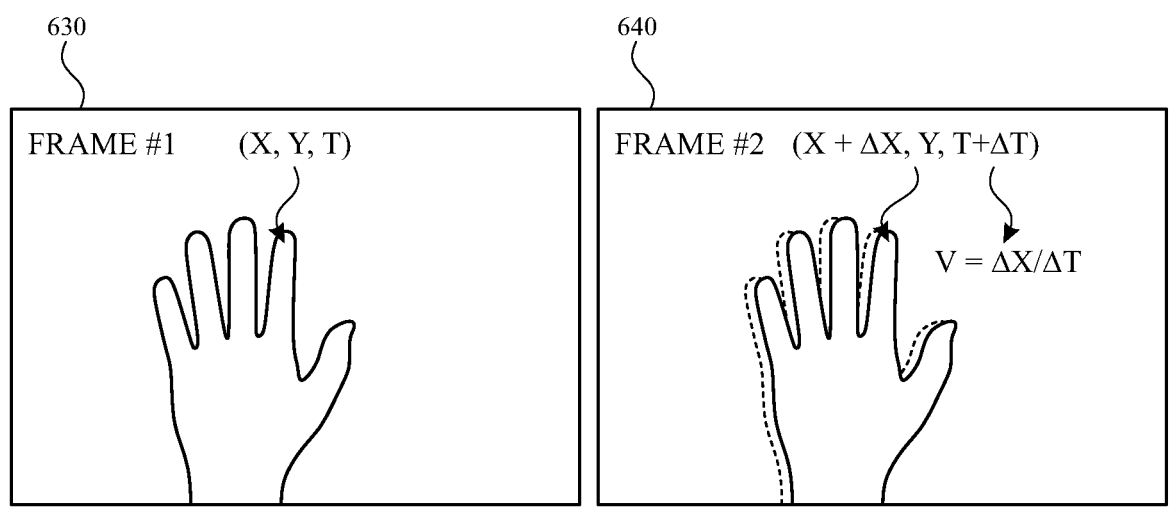
FIG. 6B illustrates example imaging frames captured by an example optical flow sensor to detect spatial-temporal image brightness variation.

It should be appreciated that the optical flow sensors can detect spatial-temporal image brightness variation in an imaging configuration with incoherent and/or ambient illumination. As such, FIG. 6B illustrates example imaging frames captured by the optical flow sensor 600 to detect spatial-temporal image brightness variation. For example, the first frame 630 includes an image of a user hand's, where the user's index finger is representative of a stylus in a first position. The second frame 640 includes the user's index finger in a second position different from the first position. The optical flow sensor 600 can detect displacement of the user's index finger between the first position and the second position based on changes in image brightness between the first frame 630 and the second frame 640.

Figure 7:
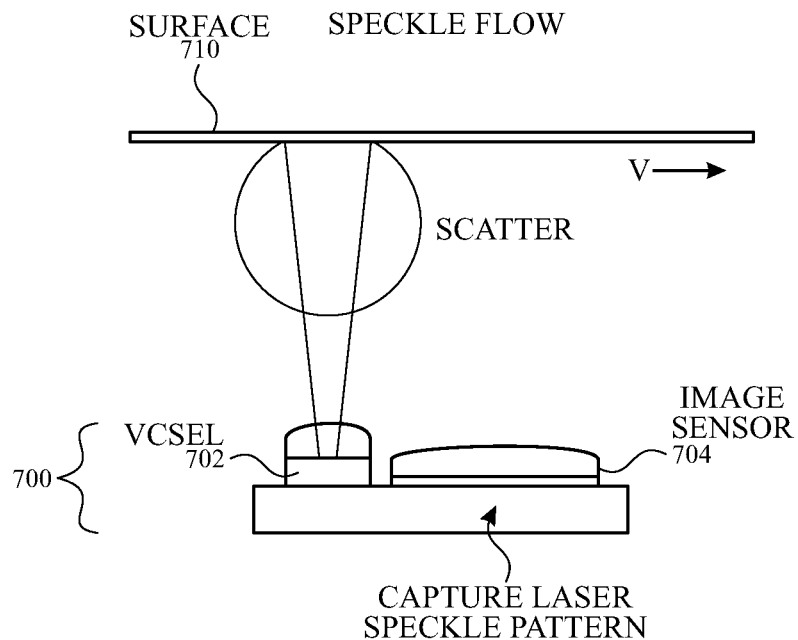
FIG. 7 illustrates an example laser speckle flow sensor configuration of an input device according to examples of the disclosure.

FIG. 7 illustrates a laser speckle flow sensor configuration of an input device according to examples of the disclosure. As laser speckle flow sensor 700 can detect speckle (e.g., interference) patterns resulting from coherent illumination of an imaging configuration to estimate motion of an input device. In some examples, the laser speckle flow sensor 700 can include a light emitter (e.g., a vertical-cavity surface-emitting laser (VCSEL) 702) to emit light onto a surface 710 and a detector (e.g., an image sensor 704) that captures an image of an environment to detect light from the surface. In some examples (not illustrated), the laser speckle flow sensor includes a lens or a lens array. It should be appreciated that the laser speckle flow sensors can detect speckle pattern (e.g., interference pattern) in an imaging configuration to estimate motion of the input device without a lens or lens array.

The laser speckle flow sensor 700 is configured to generate electromagnetic radiation (e.g., light), emit the electromagnetic radiation from a resonant cavity (e.g., a resonant optical cavity), receive a reflection or backscatter of the electromagnetic radiation (e.g., electromagnetic radiation reflected or backscattered from a surface, or an object having a surface (collectively referred to herein as a surface) back into the resonant cavity, coherently or partially coherently self-mix the generated and reflected/backscattered electromagnetic radiation within the resonant cavity, and produce an output indicative of the self-mixing (i.e., an optical signal). The generated, emitted, and received electromagnetic radiation can be coherent or partially coherent. In some examples, the electromagnetic radiation emitted by the last speckle flow sensor 700 can be generated by an electromagnetic radiation source such as VCSEL 702, a vertical external-cavity surface-emitting laser (VECSEL), an edge-emitting laser (EEL), a horizontal cavity surface emitting laser (HCSEL), a quantum-dot laser (QDL), a quantum cascade laser (QCL), or a light-emitting diode (LED) (e.g., an organic LED (OLED), a resonant-cavity LED (RC-LED), a micro LED (mLED), a super-luminescent LED (SLED), or an edge-emitting LED), and so on. The generated, emitted, and received electromagnetic radiation can include, for example, visible or invisible light (e.g., green light, infrared (IR) light, ultraviolet (UV) light, and so on). The output of the laser speckle flow sensor 700 (i.e., the optical signal) may include a photocurrent produced by a photodetector (e.g., a photodiode), which photodetector is integrated with, or positioned under, above, or next to, the sensor's electromagnetic radiation source. Alternatively and/or additionally, the output of the laser speckle flow sensor 700 may include a measurement of the current or junction voltage of the laser speckle flow sensor's electromagnetic radiation source. In some examples, the output of the laser speckle flow sensor 700 can be converted to a displacement measurement using processing circuitry described herein.

Figure 8:
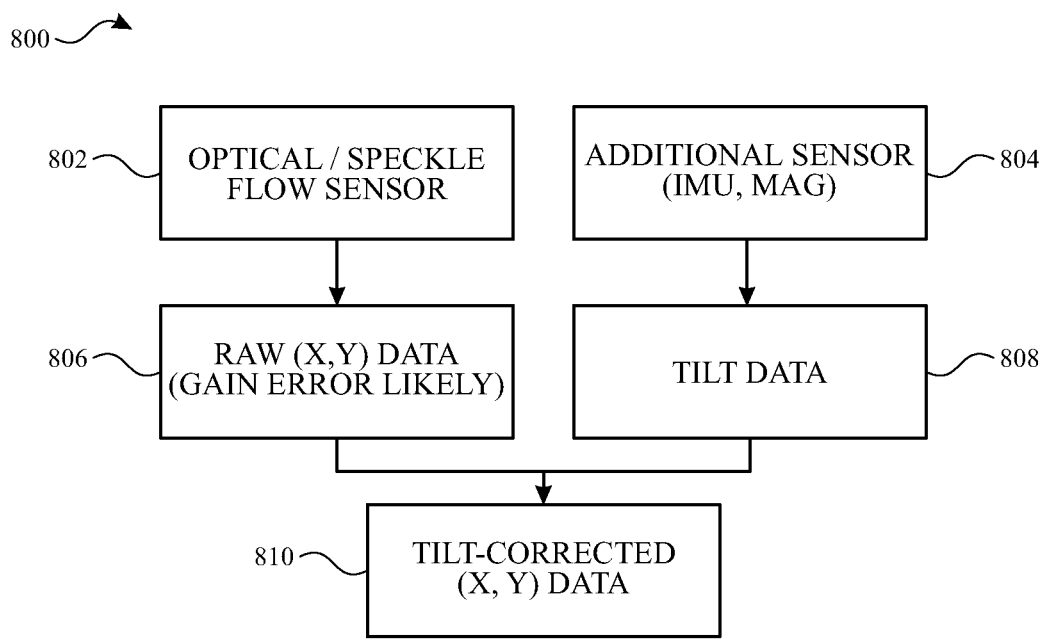
FIG. 8 illustrates a block diagram of an example input device including one optical sensor according to examples of the disclosure.

As mentioned above, in some examples, because a single optical sensor is configured to track displacement in only two dimensions (e.g., in an x-y plane), an input device can include additional sensor to measure displacement (e.g., translation) along z-axis, tilt, orientation, and/or rotation of the input device. Accordingly, FIG. 8 illustrates a block diagram of an input device 800 with a single optical sensor, such as optical sensor 802, according to examples of the disclosure. The optical sensor 802 is configured to track and/or output displacement of the input device 800 in two dimensions (e.g., in an x-y plane). However, displacement data in two dimensions 806 can be susceptible to gain (i.e., scaling) errors because the measured transformation of image recordings caused by x-y motion may vary with geometric factors such as tilt and target distance. As such, along with the optical sensor 802, the input device 800 can also include an additional sensor 804, such as a magnetic sensor, a force sensor, or an inertial measurement unit (IMU) sensor. The additional sensor 804 is configured to track and/or output tilt data 808 to compensate for the gain error resulting from the displacement in two dimensions 806. The tilt data 808 can include displacement with respect to the z-axis, tilt, orientation, and/or axial rotation of the input device. In some examples, processing circuitry of the input device 800 can receive tilt corrected data 810 from the optical sensor 802 and the additional sensor 804. In some examples, the processing circuitry can receive and/or process tilt corrected data 810 (e.g., three-dimensional displacement data) based on receiving the displacement data in two dimensions 806 from the optical sensor 802 and the tilt data 808 from the additional sensor 804.

Figure 9:
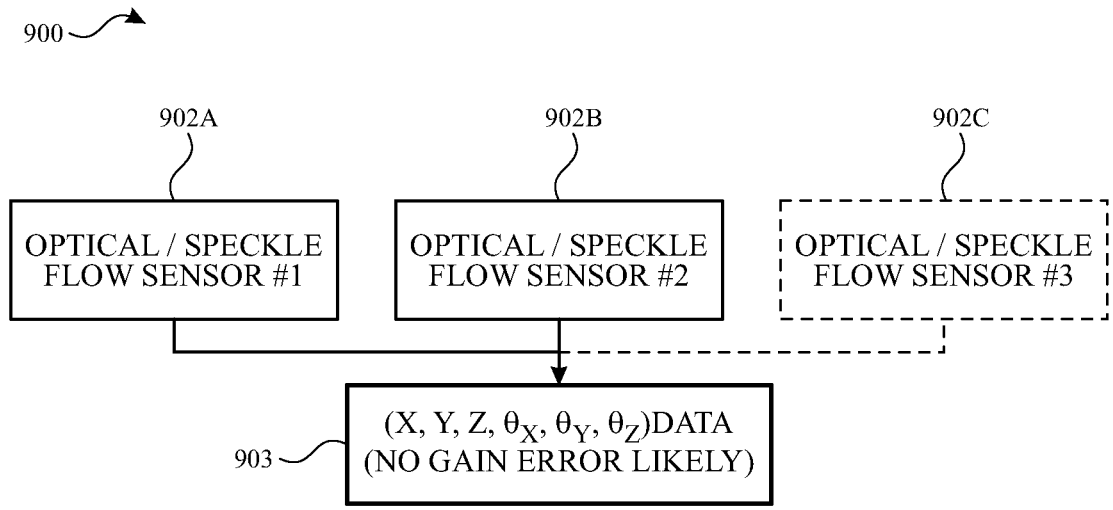
FIG. 9 illustrates a block diagram of an example input device including at least two optical sensors according to examples of the disclosure.

In some embodiments, to prevent gain error resulting from displacement data in two dimensions, an input device may include two or more optical sensors. As such, FIG. 9 illustrates a block diagram of an input device 900 with at least two optical sensors according to examples of the disclosure. For example, the input device 900 can include optical sensors 902A, 902B, and 902C. It is understood that more or fewer optical sensors may be implemented (e.g., 902A and 902B without 902C or including additional optical sensor(s) not shown). As shown by 903, the optical sensors 902A, 902B, and 902C are configured to track and/or output displacement in a three-dimensional plane, tilt, orientation, and/or axial rotation of the input device (e.g., displacement with respect to the x-axis, displacement with respect to the y-axis, displacement with respect to the z-axis, angle with respect to the x-axis, angle with respect to the y-axis, angle with respect to the z-axis).

Figure 10:
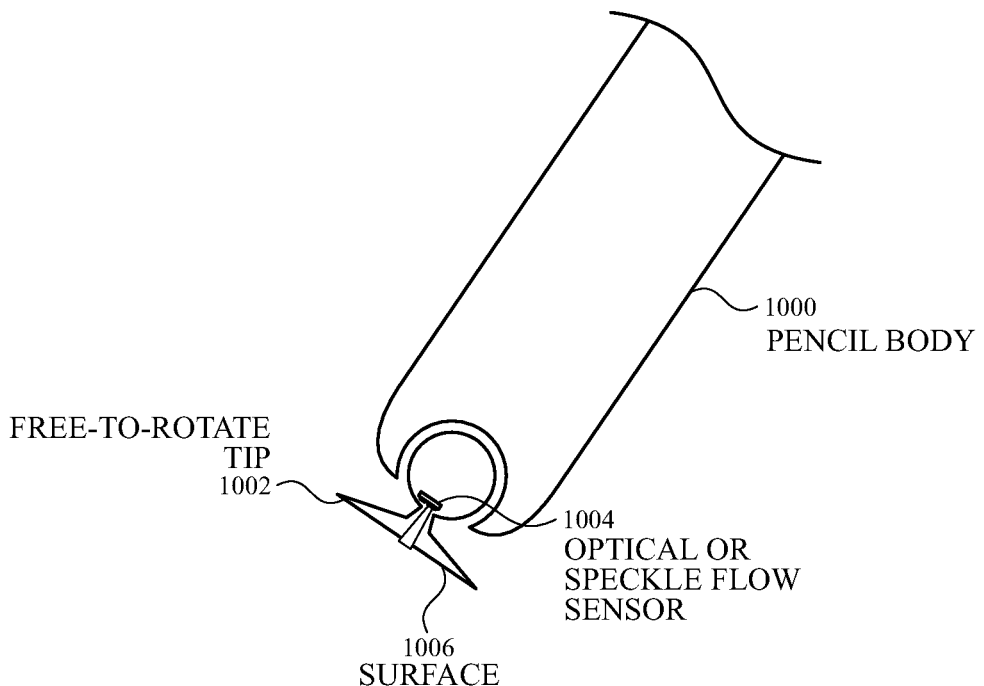
FIG. 10 illustrates an example stylus input device configuration including example optical sensor is disposed at a tip of a stylus input device according to examples of the disclosure.

In some examples, to ensure that light beams are perpendicular to a surface at a given point, optical sensor(s) are disposed within a stylus tip to efficiently detect light emitted to or reflected from the surface. Accordingly, FIG. 10 illustrates an example stylus input device configuration, where optical sensor(s) 1004 are disposed at a tip of a stylus (e.g., stylus tip 1002) according to examples of the disclosure. In some examples, the stylus tip can be a "free-to-rotate" tip, which allows for rotation of the optical circuitry at the stylus tip. Further, a "free-to-rotate" tip can ensure that the angle of incidence between the optical sensor(s) 1004 in the stylus tip 1002 and a surface 1006 remain the same at a given point (e.g., at an angular tilt position), thereby enabling the optical sensor(s) to effectively emit light and detect light reflected from the surface 1006. In some examples, the stylus tip 1002 can be partially or fully transparent (e.g., translucent) to allow light from the optical sensor(s) 1004 to exit the body (e.g., housing) of stylus 1002 and return to the optical sensor(s) 1004. In some examples, the stylus tip can be opaque to provide for a broader range of tip materials, which may be better for user experience. For example, the material of the tip can be selected to provide a physical feedback of friction that could be similar to the friction between the surface (e.g., writing surface) 1006 and a tip of an ink or lead pen or pencil. The friction provided by the stylus tip 1002 can prevent erroneous marks on the writing surface 1006 and provide more accurate input using a stylus. To emulate the sensation, the stylus tip 1002 can be formed from materials that provide a similar writing experience while allowing optical sensors to receive reflections from the surface 1006 (e.g., a non-touch-sensitive surface). For example, the stylus tip 1002 can be formed from a plastic material that when moved across a non-touch sensitive surface can provide frictional drag, thus emulating the sensation of writing with a pen or pencil. Additionally, the tip material can be selected to avoid damaging surface, to improve durability and/or to resist wear of the stylus tip 1002. When disposed within the stylus tip 1002, the optical sensor(s) 1004 are configured to track displacement in a three-dimensions (e.g., x-y-z plane), tilt, orientation, and/or axial rotation of the stylus.

In some examples, the stylus can write on a curved (non-planar), non-touch-sensitive surface. For example, optical sensor(s) 1004 can be arranged such that beams transmitted from each optical sensor 1004 can be incident on the non-touch sensitive surface and provide displacement information from points sufficiently far apart to allow for detection of surface curvature. Beams can be directed, for example, between 0.5-2 mm apart as projected on the surface. In some examples, the beams can be separated by approximately one millimeter. The information from the optical sensor(s) 1004 can be processed by processing circuitry of a computing system and/or the stylus to understand the planarity of the surface, using the calculated surface planarity to render lines corresponding to stylus strokes on the surface in the three-dimensional environment while reducing or eliminating influence from curvature of the non-touch sensitive surface.

Figure 11:
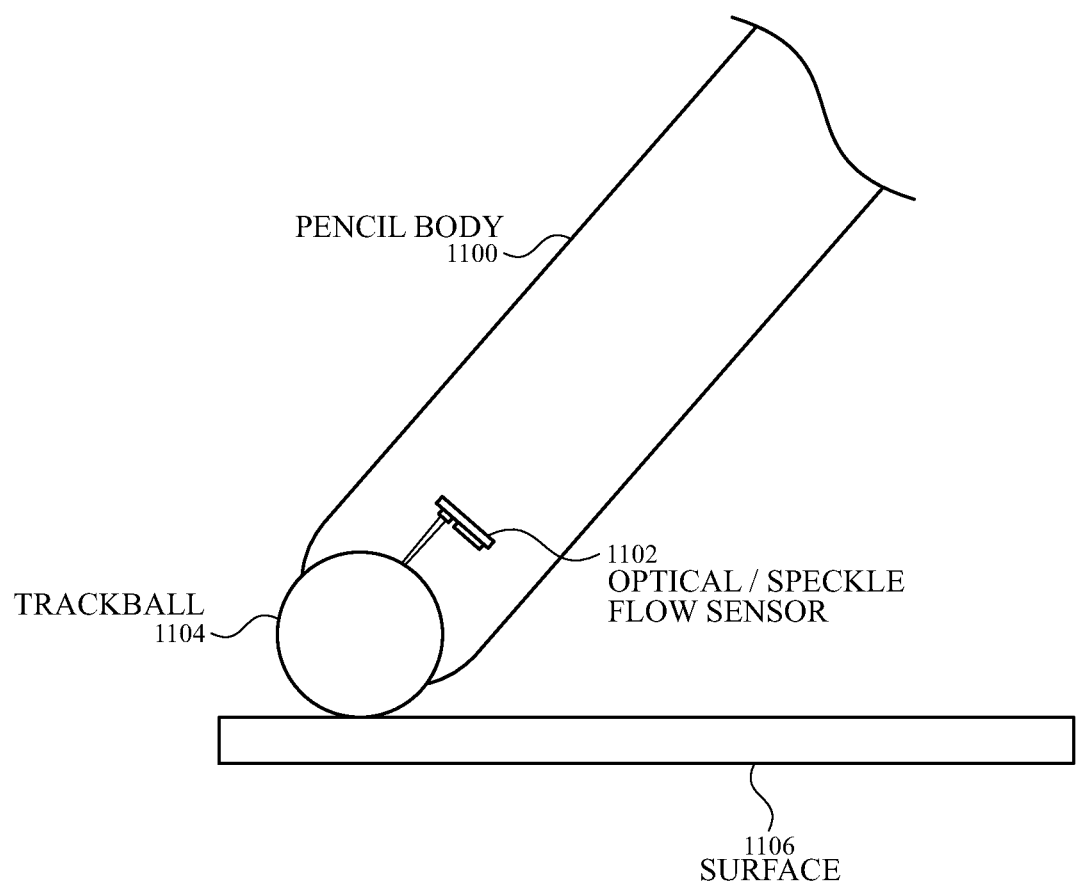
FIG. 11 illustrates an example stylus input device configuration including example trackball is disposed at a tip of a stylus input device according to examples of the disclosure.

In some examples, optical sensor(s) are disposed within a portion of a stylus body (e.g., housing of a stylus) separate from the stylus tip. The optical sensor(s) can be configured to measure displacement of internal components of a stylus, such as by tracking displacement of a trackball at least partially disposed in the housing of the stylus. Accordingly, FIG. 11 illustrates an example stylus input device configuration, where optical sensor(s) 1102 are disposed within a portion of a stylus body 1100 and a trackball 1104 is disposed with within the stylus tip. As illustrated, the trackball 1104 can be partially integrated with the stylus tip. In some examples, the trackball 1104 can be disposed partially within the stylus body 1100. The optical sensor(s) 1102 are configured to track the trackball 1104 to estimate displacement of the stylus as the stylus is moved across a non-touch-sensitive surface 1106. Although disposing the trackball 1104 at the stylus tip prevents the optical sensor(s) 1102 from accurately measuring displacement with respect to the z-axis, tilt, orientation, and/or axial rotation of the stylus, disposing the trackball 1104 at the stylus tip causes the surface 1106 to be less prone to scratch and contamination, to provide improved signal-to-noise ratios when detected by the optical sensor(s) 1102, and to be agnostic to surface optical properties.

When writing on surface 1106, force applied to the stylus tip can couple to trackball 1104, causing displacement of the trackball 1104 within the stylus tip. In some examples, optical sensor(s) 1102 can be configured to track movement of trackball 1104. For example, the optical sensor(s) can be arranged to emit light towards the end of the trackball 1104 to measure displacement. Optical sensor(s) 1102 positioned to track movement of the end of the trackball 1104 can provide information about strokes generated by the stylus while in contact with the non-touch-sensitive surface 1106 according to examples of the disclosure. For example, contact and applied force vectors between the surface 1106 and the stylus can move the trackball 1104 towards optical sensor(s) 1102. Displacement of the trackball 1104 with respect to optical sensor(s) 1102 can then be used to understand the force applied to the stylus. Information about force vectors applied to the stylus tip can be used to vary properties of content generated on a display including, but not limited to, traces and directions of stroke vectors from surface lateral movement tracking, stroke line width and its changes from surface-normal force detection, stroke textures from surface friction/roughness detection.

In some examples, the trackball 1104 can be formed at least partially of rigid materials, including, but not limited to, plastics that can reflect light from the optical sensor(s) 1102. Trackball materials can provide writing detection on surfaces independent of optical properties of the writing surfaces with which the stylus is used. In some examples, as the portion of the trackball 1104 that contacts surface 1106 vibrates in response to surface roughness, the stylus can include additional sensors configured to capture vibration. For example, one or more IMU and/or force sensors can be used to collect information about vibration. Processing circuitry of the stylus and/or computing device can then process information about vibration to account for surface roughness, varying properties of rendered lines on a display. It is understood that although optical sensor(s) 1102 provide benefits such as high-resolution positioning, tracking of stylus tilt, and translation of the trackball, alternative sensing modalities can be implemented. Additionally or alternatively, sensing types including, but not limited to, capacitive and piezoelectric sensors. In some examples, stylus rotation can be detected through integration with one or more components including, but not limited to, an external camera, magnetic sensing, calibrated IMUs, or an ergonomic depression formed on the housing to enforce a rotation angle when the stylus is held. In some examples, stylus rotation can be corrected. For example, a user can be guided through a calibration process wherein the stylus is held or moved in specific positions and/or orientations.

A system using an input device with optical sensors can in some cases be used to provide input to an augmented, virtual or mixed reality application. In some examples, optical sensors can measure displacement with respect to the x-axis, displacement with respect to the y-axis, displacement with respect to the z-axis, tilt, orientation, and/or axial rotation of the input device (e.g., stylus). In some examples, the processing circuitry of the input device and/or computing system can receive displacement with respect to the x-axis, displacement with respect to the y-axis, displacement with respect to the z-axis, tilt, orientation, and/or axial rotation of the stylus from the optical sensor(s) and/or additional sensor(s). In some examples, the processing circuitry of the input device and/or computing system can process and/or calculate displacement within a 3-dimensional space based on displacement parameters from the optical sensor(s) and/or additional sensor(s).

In some examples, the system can contextualize information gathered before, during and/or after a stylus is moved to extrapolate stylus position and/or motion when optical sensor data may be incomplete. For example, a stylus can be held in a transient position including, but not limited to, held orthogonal to a surface or held parallel to the surface such that one or more optical beams may not be incident on the surface, or otherwise held at a distance outside of a focusing range of the optical sensors. As a result, the optical sensors may not receive a retroreflective signal from the surface, or may not receive a complete retroreflective signal (e.g., missing a lateral beam vector component corresponding to lateral velocity). To determine three-dimensional position and/or movement of the stylus, the system can extrapolate from information that precedes or follows the previously mentioned transient positions. Integrating movement and/or position data prior to the transient position can allow for an estimate the movement and/or position of the stylus during the transient state.

In some examples, as described herein the arrangement of the optical sensor(s) and/or additional sensor(s) can provide information that informs how the system renders strokes on a display. For example, stylus tilt can be determined and vary properties of strokes rendered on the display. While writing, the stylus end opposite from the tip can be lowered towards the non-touch-sensitive surface. The system can be configured to emulate the experience of writing with a pen or pencil such that, when the stylus is lowered towards the non-touch-sensitive surface, a line width rendered on the display can increase. In further examples, while writing, the stylus end opposite from the tip can be raised away from the non-touch-sensitive surface, towards a position wherein the stylus is orthogonal to the surface. The system can be configured to narrow line width rendered on the display in response to detecting the stylus movement.

In some examples, to improve estimation of stylus yaw, pitch, and roll (e.g., tilt, orientation, and rotation) and more accurately process and render strokes, the computing system can use information from one or more sensing devices of the computing device (e.g., force sensor, magnetic sensor, IMU, ultrasonic, infrared, OFC) and from the stylus to store a multi-dimensional map of the non-touch sensitive surface. Prior to rendering strokes on a display, information from the optical sensor(s) can be used by the one more processors to correct any skew in the surface coordinate system that may result from stylus rotation in the hand of the user. Using the addition of information from optical sensor(s) and/or additional sensor(s) to calculate stylus yaw (e.g., tilt, orientation, and/or axial rotation) can be used to reduce algorithmic complexity, thus reducing processing power and/or increasing processing speed, according to some examples of the disclosure.

Therefore, according to the above, some examples of the disclosure are directed to a stylus. The stylus can comprise an optical sensor configured to track displacement of the stylus relative to one or more surfaces based on emitting light to and detecting light from the one or more surfaces. The optical sensor can comprise an optical flow sensor or a laser speckle flow sensor. The system can wireless communication circuitry coupled to the optical sensor, where the wireless communication circuitry is configured to transmit information from the stylus to an external device configured to use the information from the stylus as input. The information can include displacement data from the optical sensor, other information derived from the displacement data, or both. Additionally or alternatively to one or more of the examples disclosed above, in some examples, the optical sensor can include a light emitter and a light detector. Additionally or alternatively to one or more of the examples disclosed above, in some examples, the optical sensor is configured to detect displacement of the stylus without a lens. Additionally or alternatively to one or more of the examples disclosed above, in some examples, the stylus can include an additional sensor coupled to the wireless communication circuitry and configured to measure a tilt, an orientation, an axial rotation, or any combination thereof of the stylus to compensate for gain error in the displacement data. Additionally or alternatively to one or more of the examples disclosed above, in some examples, the additional sensor comprises a second optical sensor, and inertial measurement unit (IMU) sensor, a magnetic sensor, a force sensor, or any combination thereof. Additionally or alternatively to one or more of the examples disclosed above, in some examples, the stylus can include at least two optical sensors configured to track displacement of the stylus in three, four, five, or six dimensions. Additionally or alternatively to one or more of the examples disclosed above, in some examples, the optical sensor is disposed at a tip of the stylus such that the optical sensor is configured to track motion of the tip of the stylus relative to the one or more surfaces. Additionally or alternatively to one or more of the examples disclosed above, in some examples, the stylus can include a trackball disposed at a tip of the stylus such that the optical sensor is configured to track motion of the trackball relative to the one or more surfaces. Additionally or alternatively to one or more of the examples disclosed above, in some examples, tip of the stylus is formed from an optically transparent or translucent material. Additionally or alternatively to one or more of the examples disclosed above, in some examples, a tip of the stylus is formed from opaque material and the tip includes a plurality of windows for beams from one or more optical sensors to exit and return to the stylus. Additionally or alternatively to one or more of the examples disclosed above, in some examples, using the information from the stylus as input can include rendering writing or drawing strokes of the stylus on a non-touch sensitive surface. Some examples of the disclosure are directed to a method of operating the system described herein or a non-transitory computer readable storage medium storing instructions configured to be executed by one or more processors of the system to cause the processor(s) to perform any of the above operations of the system.

Some examples of the disclosure are directed to a system. The system can comprise: a first device comprising: a plurality of first sensors configured to track displacement, tilt, orientation, axial rotation, or any combination thereof of the first device in contact with a non-touch sensitive surface and first communication circuitry coupled to the plurality of first sensors and configured to transmit information from the plurality of first sensors to a second device. The system can comprise the second device, the second device comprising: one or more second sensors configured to track displacement between the first device and the non-touch sensitive surface; second communication circuitry configured to receive the information from the plurality of first sensors; processing circuitry configured to compute three-dimensional displacement of the first device using the information from the plurality of first sensors and generate content using the three-dimensional displacement of the first device and the distance between the first device and the non-touch sensitive surface; and a display configured to display the content generated by the processing circuitry on the non-touch sensitive surface. Additionally or alternatively to one or more of the examples disclosed above, in some examples, the plurality of first sensors can include at least two optical sensors. Additionally or alternatively to one or more of the examples disclosed above, in some examples, the plurality of first sensors can include an optical sensor and an additional sensor comprising a force sensor, a magnetic sensor, an inertial magnetic unit (IMU) sensor, or any combination thereof. Additionally or alternatively to one or more of the examples disclosed above, in some examples, the plurality of first sensors can include as least an optical flow sensor or a laser speckle flow sensor. Additionally or alternatively to one or more of the examples disclosed above, in some examples, the first device can be a stylus and the second device can be a head-mounted display device. Additionally or alternatively to one or more of the examples disclosed above, in some examples, the one or more second sensors can include a camera, a magnetic sensor, audio sensor, or an electromagnetic sensor configured to track the distance between the first device and the non-touch sensitive surface using changes in light field, magnetic field, acoustic field, or electromagnetic field. Some examples of the disclosure are directed to a method of operating the system described herein or a non-transitory computer readable storage medium storing instructions configured to be executed by one or more processors of the system to cause the processor(s) to perform any of the above operations of the system.

Some examples of the disclosure are directed to a method. The method can include activating an input device in accordance with a determination that the input device satisfies one or more activation criteria comprising a criterion that is satisfied when the input device is within a threshold working distance of a non-touch sensitive surface; detecting contact between the input device and the non-touch sensitive surface; tracking, via one or more optical sensors, displacement parameters of the input device based on activating the input device and detecting contact between the input device and the non-touch sensitive surface; rendering, via processing circuitry, content on the non-touch sensitive surface using the display parameters; detecting a break in contact between the input device and the non-touch sensitive surface; and deactivating the input device in accordance with a determination that the input device satisfies one or more deactivation criteria comprising a criterion that is satisfied when the input device is outside the threshold working distance of the non-touch sensitive surface. Additionally or alternatively to one or more of the examples disclosed above, in some examples, the displacement parameters can include displacement of the input device in a three-dimensional plane, tilt, orientation, axial rotation, or any combination thereof. Additionally or alternatively to one or more of the examples disclosed above, in some examples, the method can include forgoing tracking of the displacement parameters of the input device in response to deactivating the input device. Some examples of the disclosure are directed to a non-transitory computer readable storage medium storing instructions configured to be executed by one or more processors of the system to cause the processor(s) to perform any of the above operations of the system.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A system comprising:
a first device comprising:
a plurality of first sensors configured to track displacement in position and angle of the first device relative to a non-touch sensitive surface; and
first communication circuitry coupled to the plurality of first sensors and configured to transmit information from the plurality of first sensors to a second device;
the second device comprising:
one or more second sensors configured to track a distance between the first device and the non-touch sensitive surface;
second communication circuitry configured to receive the information from the plurality of first sensors;
processing circuitry configured to receive the displacement in position and angle of the first device from the plurality of first sensors and generate content using the displacement in position and angle of the first device and the distance between the first device and the non-touch sensitive surface; and
a display configured to display the content generated by the processing circuitry on the non-touch sensitive surface.

2. The system of claim 1, wherein the plurality of first sensors comprises at least two optical sensors.

3. The system of claim 1, wherein the plurality of first sensors comprises an optical sensor and an additional sensor comprising a force sensor, a magnetic sensor, an inertial magnetic unit (IMU) sensor, or any combination thereof.

4. The system of claim 1, wherein the plurality of first sensors comprises as least an optical flow sensor or a laser speckle flow sensor.

5. The system of claim 1, wherein the first device comprises a stylus and the second device comprises a head-mounted display device.

6. The system of claim 1, wherein the one or more second sensors comprise a camera, a magnetic sensor, audio sensor, or an electromagnetic sensor configured to track the distance between the first device and the non-touch sensitive surface using changes in light field, magnetic field, acoustic field, or electromagnetic field.

7. The system of claim 1, wherein the plurality of first sensors comprises a light emitter configured to emit light and a light detector configured to detect the light reflected from the non-touch sensitive surface.

8. The system of claim 1, wherein the plurality of first sensors comprises a sensor configured to measure a tilt, an orientation, an axial rotation, or any combination thereof of the first device to compensate for gain error in the displacement in position and angle of the first device.

9. The system of claim 1, wherein the plurality of first sensors comprises at least two optical sensors configured to track displacement of the first device in six dimensions.

10. An electronic device comprising:
communication circuitry configured to receive information from a plurality of first sensors, wherein the first sensors are configured to track displacement in position and angle of a first device relative to a non-touch sensitive surface;
one or more second sensors configured to track a distance between the first device and the non-touch sensitive surface;
processing circuitry configured to receive the displacement in position and angle of the first device from the plurality of first sensors and generate content using the displacement in position and angle of the first device and the distance between the first device and the non-touch sensitive surface; and a display configured to display the content generated by the processing circuitry on the non-touch sensitive surface.

11. The device of claim 10, wherein the plurality of first sensors comprises at least two optical sensors.

12. The device of claim 10, wherein the plurality of first sensors comprises an optical sensor and an additional sensor comprising a force sensor, a magnetic sensor, an inertial magnetic unit (IMU) sensor, or any combination thereof.

13. The device of claim 10, wherein the plurality of first sensors comprises as least an optical flow sensor or a laser speckle flow sensor.

14. The device of claim 10, wherein the first device comprises a stylus and the electronic device comprises a head-mounted display device.

15. The device of claim 10, wherein the one or more second sensors comprise a camera, a magnetic sensor, audio sensor, or an electromagnetic sensor configured to track the distance between the first device and the non-touch sensitive surface using changes in light field, magnetic field, acoustic field, or electromagnetic field.

16. The device of claim 10, wherein the plurality of first sensors comprises a light emitter configured to emit light and a light detector configured to detect the light reflected from the non-touch sensitive surface.

17. The device of claim 10, wherein the plurality of first sensors comprises a sensor configured to measure a tilt, an orientation, an axial rotation, or any combination thereof of the first device to compensate for gain error in the displacement in position and angle of the first device.

18. The device of claim 10, wherein the plurality of first sensors comprises at least two optical sensors configured to track displacement of the first device in six dimensions.

* * * * *